United States Patent [19]

Inoue et al.

[11] Patent Number: 4,834,545

[45] Date of Patent: May 30, 1989

[54] MULTIPLE FLUID MIXING APPARATUS

[75] Inventors: Takao Inoue, Osaka; Kenichiro Suetsugu, Amagasaki, both of Japan

[73] Assignee: Matsushita Electric Industrial Co., Ltd., Japan

[21] Appl. No.: 870,410

[22] Filed: Jun. 4, 1986

[30] Foreign Application Priority Data

Nov. 28, 1985 [JP] Japan ................................ 60-267879
Dec. 3, 1985 [JP] Japan ................................ 60-271846

[51] Int. Cl.[4] .......................... B01F 7/04; B01F 15/02; B29C 45/18; B29C 45/74

[52] U.S. Cl. .................................... 366/138; 222/135; 222/145; 222/390; 366/155; 366/162; 366/171; 366/172; 366/177; 366/196; 366/305; 425/551

[58] Field of Search ............... 366/154, 155, 162, 165, 366/196, 254, 289, 168, 172, 171, 315, 138, 194, 177, 144, 145, 148, 305; 222/389, 390, 135, 138, 142, 145; 422/133, 135; 425/551, 549, 547, 557, 574, 543

[56] References Cited

U.S. PATENT DOCUMENTS 2,333,456 11/1943 Wynn .
3,180,350 4/1965 Rill, Jr. et al. .................. 366/145 X
3,632,022 1/1972 Simmonds, Jr. et al. ...... 222/135 X
3,997,145 12/1976 Benson .
4,106,115 8/1978 Takahashi et al. .................. 366/138
4,171,163 10/1979 Hawkins ............................ 366/145
4,313,909 2/1982 Boden et al. ........................ 422/133
4,426,023 1/1984 Sperry et al. ................... 366/138 X
4,486,102 12/1984 Thiele et al. .................... 366/196 X

FOREIGN PATENT DOCUMENTS 1090183 10/1960 Fed. Rep. of Germany .
1454868 4/1970 Fed. Rep. of Germany .
1936945 2/1971 Fed. Rep. of Germany .
1449984 7/1966 France .
1533768 6/1968 France .
2048093 12/1980 United Kingdom ................ 422/133

*Primary Examiner*—Harvey C. Hornsby
*Assistant Examiner*—Scott J. Haugland
*Attorney, Agent, or Firm*—Lowe, Price, Leblanc, Becker & Shur

[57] ABSTRACT

A mixing apparatus for mixing two or more liquids, e.g. as required in reactive injection molding, has a rotary member mounted for rotational and axial movement within a cylindrical bore of a mixing head, with a convex conical surface of the rotary member disposed opposite a concave conical surface formed at a lower end of the bore. Mixing is performed by axially displacing the rotary member to form a mixing gap between the conical surfaces, injecting two or more liquids into the gap from the periphery thereof, and rotating the rotary member at high speed to mix the liquids, the mixture being ejected from a central aperture formed in the concave conical surface. On completion of the mixing operation, residual mixture is ejected by moving the conical surfaces into close contact.

10 Claims, 8 Drawing Sheets

MULTIPLE FLUID MIXING APPARATUS

BACKGROUND OF THE INVENTION

The present invention relates to an apparatus for mixing a plurality of fluids, e.g. for mixing liquified raw materials to be utilized in a reactive injection molding machine, a vacuum injection molding machine, small-scale dispenser, etc. In the prior art, various methods have been used to mix such liquified raw materials. With one such method, the liquids to be mixed are led into a vessel, and mixed therein by a forcible mixing apparatus having mixing vanes, which may be of various shapes. With another prior art method, the liquids to be mixed are caused to flow between fixed separator plates and separator vanes, to ensure that the liquids remain separated until mixing is initiated. In another method, the raw materials are made to mutually collide under high pressure, within a narrow chamber, to thereby accomplish mixing.

In the case of a forcible mixing apparatus having mixing vanes, or an apparatus employing fixed separator plates and separator vanes, large gaps exist between fixed and movable parts of the apparatus. As a result, substantial amounts of residual mixture are left within these gaps in the apparatus when mixing has been terminated and the mixture removed. If this residual mixture is cleaned from the apparatus by utilizing a cleaning gas and a detergent liquid, it is necessary to employ large quantities of gas and detergent. Furthermore, some residual amounts of detergent will remain in the interior of the apparatus on completion of such cleaning, and this adversely affects the physical characteristics of the mixed material which is subsequently produced by the apparatus, Such cleaning also results in increased manufacturing costs.

The method whereby mixing is accomplished by mutual collision of the raw materials is satisfactory if the materials to be mixed have a low viscosity. However since the mixing forces produced by this method are relatively weak, the method is not suitable for mixing materials having a high viscosity, such as fillers. Furthermore if this method is employed for mixing relatively high viscosity materials, it is necessary to provide a source of high pressure such as a hydraulic pump.

SUMMARY OF THE INVENTION

It is an objective of the present invention to provide a mixing apparatus for mixing a plurality of liquids, whereby the disadvantages of prior art apparatus of this type, such as difficulty of cleaning out of residual mixture from the apparatus on completion of mixing operations, are eliminated, and whereby liquids having a high degree of viscosity will be effectively mixed. To achieve these objectives, mixing is performed by an apparatus according to the present invention within a gap which is opened between two opposing surfaces, with one of these surfaces being rotated with respect to the other surface to thereby produce shear stress between liquids which are injected into the gap, and to thereby effectively mix the liquids. The mixture is ejected from an aperture formed in one of these surfaces close to the center of rotation. On completion of mixing operations, the mixing gap is closed, by bringing the two surfaces into close contact, whereby the residual mixture is substantially completely ejected from the ejection aperture. Cleaning of the mixing surfaces can then be performed by again opening a gap between them, and passing flows of cleaning fluids, such as detergent liquid and a cleaning gas, between the surfaces while one surface is rotated with respect to the other.

More particularly, the present invention comprises an apparatus for mixing a plurality of liquids, comprising:

a mixing head having a cylindrical bore formed therein, and having a lower surface with an ejection aperture formed therein for outlet of a mixture of the liquids following mixing;

a rotary member shaped to fit closely within the cylindrical bore opposite the lower surface of the mixing head, and supported by a shaft for rotation relative to the lower surface of the mixing head and for movement along the axis of the rotation for selectively establishing a condition in which the rotary member is in close contact with the lower surface of the mixing head and a condition in which a mixing gap is formed between the rotary member, the lower surface of the mixing head, and a circumferential section of the cylindrical bore;

means for rotating the rotary member;

means for displacing the rotary member along the axis of rotation thereof;

a plurality of supply apertures formed in the mixing head, communicating with the mixing gap, for supplying the raw materials in liquid form to the mixing gap;

sealing means disposed between the rotary member and the mixing head, and; means for supplying the liquified raw materials to the supply apertures.

BRIEF DESCRIPTION OF THE DRAWINGS

FIG. 4(*b*) is a plan cross-sectional view showing essential portions of a mixing head in the second embodiment;

FIG. 6(*b*) is a cross-sectional view in elevation of the reactive injection molding machine of FIG. 6(*a*);

FIG. 8(*b*) is a plan cross-sectional view showing essential portions of a mixing head in the third embodiment;

DESCRIPTION OF THE PREFERRED EMBODIMENTS

Figure 1:
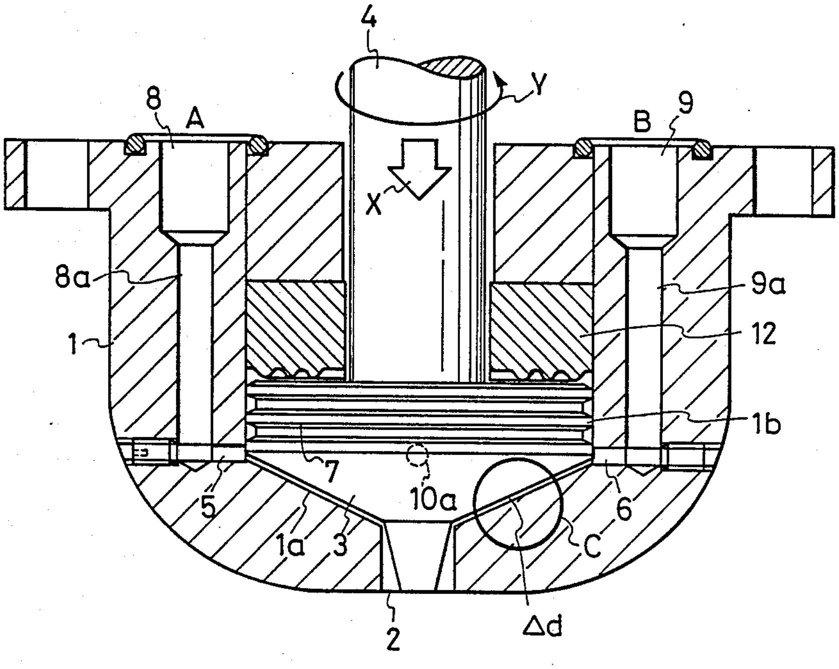
FIG. 1 is a cross-sectional view in elevation of a first embodiment of a mixing apparatus according to the present invention.
Figure 2:
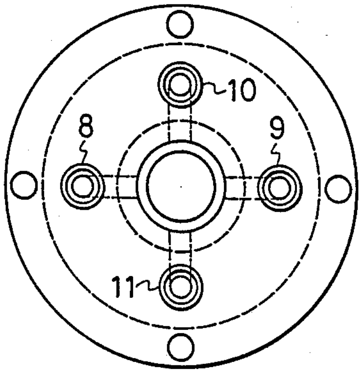
FIG. 2 is a plan cross-sectional view showing essential portions of a mixing head in the first embodiment.
Figure 3A:
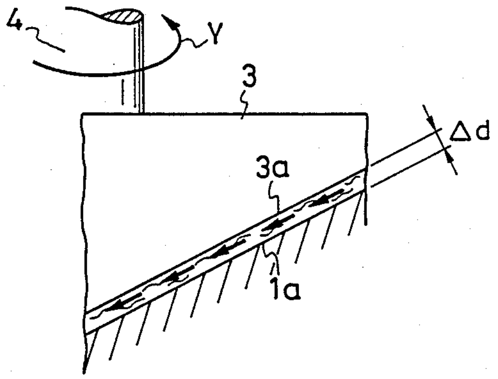
FIGS. 3(*a*), (*b*) and (*c*) are expanded cross-sectional views of a portion of the first embodiment, to illustrate the mixing of liquids.
Figure 3B:
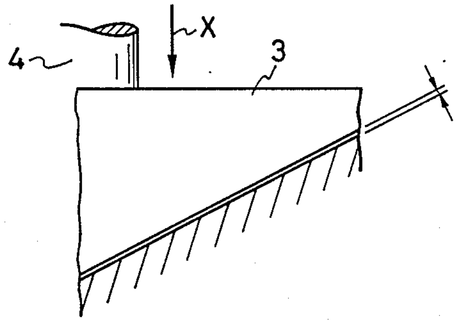
Figure 3C:
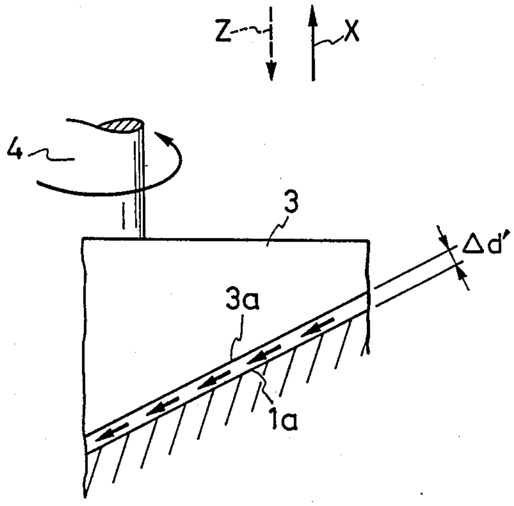

A first embodiment of the present invention will be described, referring to FIGS. 1 through 3. In FIGS. 1 and 2, reference numeral 1 denotes a mixing head having an ejection aperture 2 formed in a lower face 1*a*, for outlet of a mixture of raw material fluids upon completion of mixing. The lower face 1*a* of mixing head 1 is of concave conical shape, while a cylindrical surface 1*b* of a tubular bore formed in the mixing head 1 extends upward from the outer periphery of the lower surface 1*a*, i.e. with the lower surface 1*a* extending radially inward from a lower end of that tubular bore. Numeral 3 denotes a rotary member which fits closely within the cylindrical surface 1*b* and has a lower face formed thereon which is of convex conical shape, formed such as to be capable of mating closely against the lower face 1*b* of the mixing head 1. The rotary member 3 is supported by a shaft 4 such as to permit rotation of rotary member 3 about the central axis of shaft 4, in the direction indicated by arrow Y, and further such as to permit movement of the rotary member 3 along the direction of the central axis of shaft 4 for enabling a first condition to be established in which the rotary member 3 is separated from the conical lower face 1*a* of mixing head 1 by a specific gap Δd (referred to in the following as the mixing gap), and a second condition in which the rotary member 3 is brought into close contact with the lower face 1*a* by movement along the direction indicated by arrow X. It will be understood from FIG. 1 that the mixing gap Δd is formed between the opposed conical surfaces of the mixing head 1 and rotary member 3 and a small peripheral section of the cylindrical surface 1*b*. Numerals 5 and 6 denote two of a plurality of supply apertures which are formed mutually independently and serve to supply liquids to the mixing gap Δd. Numeral 7 denotes a set of fluid-tight sealing rings which are disposed between the periphery of the rotary member 3 and the cylindrical surface 3*a* of the mixing head 1. Numerals 8 and 9 denote fluid inlet apertures for respectively receiving the fluids to be mixed, designated as A and B. These fluids then pass through passages 8*a*, 9*a* to supply apertures 5 and 6 respectively. The mixing head 1 further includes a detergent liquid inlet aperture 10 which communicates with a supply aperture 10*a*, leading into the mixing gap d, and a cleaning gas inlet aperture 11 which communicates with a supply aperture (not shown in the drawings) leading into mixing gap Δd.

Numeral 12 denotes an elastic body which serves to move the rotary member 3 along the direction of arrow X when the supply of fluids under pressure to the mixing gap Δd is halted, as described hereinafter.

This embodiment is suitable for mixing two liquids to form a synthetic resin, for example. FIGS. 3(*a*) to (*c*) are partial cross-sectional views for assistance in describing the operation. During mixing, the fluids A and B constituting the raw materials are ejected out of the supply apertures 5 and 6 under sufficient pressure to overcome a force exerted by the elastic body 12, i.e. a force acting to push the conical surfaces of the mixing head 1 and the rotary member 3 into close contact. A mixing gap Δd is thereby formed between the lower surface 1*a* and an opposing surface 3*a* of the rotary member 3, into which the raw materials are forced. The rotary member 3 is then rotated at high speed by shaft 4 (i.e. in the direction of arrow Y in FIG. 3), producing relative rotary motion between the concave conical surface 1*a* and the convex conical surface 3*a* of rotary member 3. Shear stress thereby is produced in the raw materials A and B, resulting in mixing of these fluids. The resultant mixture is ejected through ejection aperture 2. Upon completion of mixing, when input of fluids A and B to the gap Δd is terminated, the biasing force exerted by the elastic body 12 acts to close the gap Δd, whereby the convex conical surface 3*a* of rotary member 3 is forced into close contact with the concave conical lower surface 1*a*, as shown in FIG. 3(*b*). The residual mixture is thereby ejected from ejection aperture 2. Next, a detergent liquid and a detergent gas are successively injected, under sufficient pressure to overcome the biasing force exerted by the elastic body 12, through the fluid inlet apertures 10 and 11. The rotary member 3 is thereby forced upward, to open a gap Δd', which is smaller than the mixing gap Δd, as illustrated in FIG. 3(*c*). The rotary member 3 is the rotated at high speed in the direction of arrow Y, whereby all residual mixture is effectively cleaned from the conical faces 1*a* and 3*a*. The injection of detergent liquid and cleaning gas is halted when cleaning is completed, whereupon the biasing force produced by the elastic body 12 closes the gap Δd'. This completes a cycle of operations in which mixing is performed, followed by cleaning of the mixing head.

It can be understood from the above that with the first embodiment described above, a plurality of fluids constituting raw materials are respectively injected under between two mixing surfaces (1*a* and 3*a*) being held in close contact by a biasing force produced by an elastic body, whereby a mixing gap is opened between the two surfaces. Relative motion at high speed is then produced between these two surfaces, resulting in shear stress being produced in the raw materials within the mixing gap, and hence effective mixing of the raw materials. Upon completion of mixing, the two mixing surfaces are brought into close contact by the biasing force of the elastic body, to thereby eject a maximum amount of residual mixture remaining between the two surfaces. The mixing surfaces are then forced slightly apart by injection of a detergent liquid and a cleaning gas between them under pressure, and relative motion is again produced between the surfaces, to implement effective cleaning of the surfaces.

It is preferable that the two mixing surfaces be of mutually complementary conical shapes, i.e. respectively convex and concave, to thereby enable the surfaces to be readily brought into close contact, and thereby enable optimum removal of any residual mixture left between the mixing surfaces upon completion of mixing operation.

It is also preferable that the size of the gap between the mixing surfaces during cleaning, when detergent liquid and cleaning gas are being injected under pressure between the two surfaces, be made smaller than the size of gap during mixing. This narrower gap during cleaning serves to increase the resistance to flow of the detergent liquid and cleaning gas through the gap, and hence increases the effectiveness of cleaning the mixing surfaces.

During cleaning, it is preferable that two fluids be utilized in succession. First, a detergent liquid such as an organic solvent is injected between the mixing surfaces, to produce a gap between the surfaces and to flow into this gap. Next, a cleaning gas consisting of an inactive gas such as $N_2$ is injected under pressure to flow between the surfaces.

The size of the gap produced between the mixing surfaces, for mixing and cleaning operations, is preferably adjusted with a fixed biasing force applied between the surfaces and with zero relative motion between the surfaces. The gap size is then set to a required value by adjustment of the injection pressure of the raw material fluids (in the case of mixing) or the cleaning fluids (during cleaning).

Figure 4A:
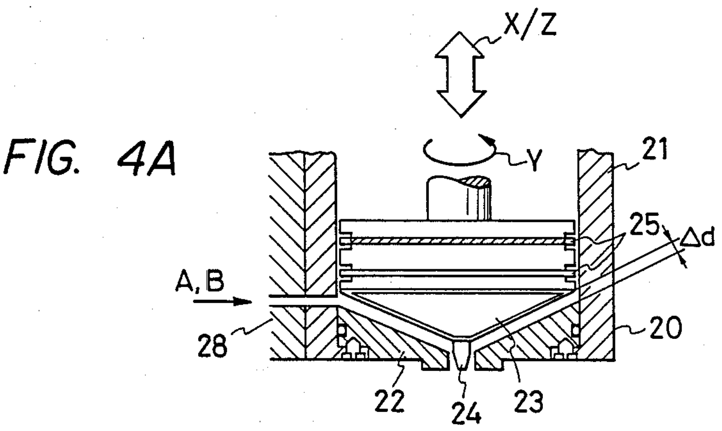
FIG. 4(*a*) is a cross-sectional view in elevation of a second embodiment of a mixing apparatus according to the present invention.
Figure 4B:
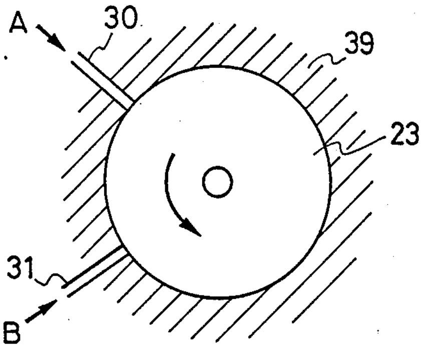

A second embodiment of the present invention will now be described, referring to FIGS. 4 through 7. In FIG. 4(*a*), numeral 21 denotes a mixing head, which constitutes the body of a mixing head 20. A fixed cone plate member 22 is mounted at the lower end of the mixing head 21, while a movable cone plate unit 23, constituting a rotary member, is mounted for rotational and axial movement within a cylindrical bore formed in the head block 21. The movable cone plate unit 23 is sealed with respect to this bore by means of packing rings 25, formed of a material such as teflon or silicon rubber for example, and is rotatable by a motor (described hereinafter) to rotate at a maximum speed of 500 rpm, in the direction indicated by arrow 27. The cone plate unit 23 is further movable along the direction indicated by arrow X/Z, to form a gap Δd, by the action of an actuating cylinder (described hereinafter). The embodiment will be described assuming that the raw materials to be mixed consist of nylon of a type which is suitable for reactive injection molding (RIM) (for example UX-B material manufactured by the Ube Kosan Co. Ltd) and urethane (e.g. manufactured by Nippon Xenon Co. Ltd). The two fluids constituting the raw materials, designated respectively as A and B, are caused to flow along paths 30 and 31 shown in FIG. 4(*b*) respectively, through respective passages formed in the mixing head (one of which is indicated as 28 in FIG. 48*a*)) into the mixing gap Δd, and are mixed therein by rotation of the movable cone plate unit 22 which produces shear stress within these fluids as described above for the first embodiment. Upon completion of mixing, the cone plate unit 22 is moved downwards, to thereby close the mixing gap Δd. The residual mixture is thereby ejected through a nozzle 24, constituting the ejection aperture.

Figure 5:
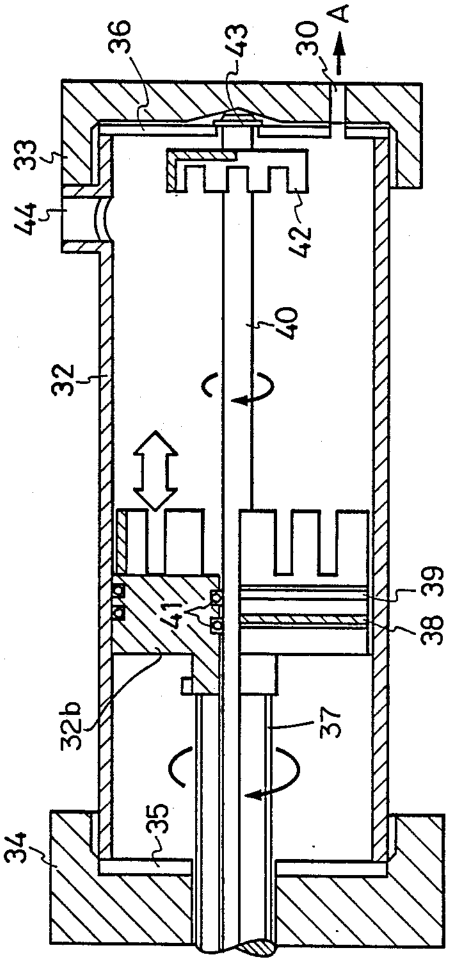
FIG. 5 is a cross-sectional view of a piston cylinder for use with the second embodiment.

FIG. 5 shows a piston cylinder incorporating an agitator piston, which is suitable for injecting the raw materials into the second embodiment of the present invention. Two of these piston cylinders are required for respectively injecting the two raw material liquids into the mixing gap, but only one is shown in FIG. 5. This comprises a cylinder 32 having a smoothly honed bore formed therein, which is attached at one end thereof to a mixing head block by a holder 33 and which has a holder 34, having a threaded bore formed therein, mounted at the opposite end thereof. The holders 33 and 34 are respectively sealed by means of teflon packing members 36 and 35. A piston 32*b*, having mixing vanes formed thereon, is rotated by a piston drive screw (schematically shown at 37), and also is moved axially by rotation of piston drive screw 37 as indicated by the arrows. The piston 32*b* is sealed within the bore of cylinder 32 by means of a teflon member 39 and by silicon rubber packing rings 38. An agitation vane rotation shaft 40 passes through the central axial portion of the piston drive screw 37, and is retained at one end thereof to one end of cylinder 32 by means of a retaining ring 43. The agitation vane rotation shaft 40 serves to rotate a set of agitation vanes 42 at high speed, and is sealed by means of sealing rings 41.

The reactive raw material is supplied from a raw material tank, through a valve which is coupled to an inlet aperture 44. When the piston 32*b* is retracted, i.e. moved to the left (as seen in FIG. 5), the raw material is drawn into the interior of the cylinder 32, and when the piston is then advanced (i.e. moved to the right, as seen in FIG. 5), the raw material is injected through a supply passage 30 into the mixing gap.

Figure 6A:
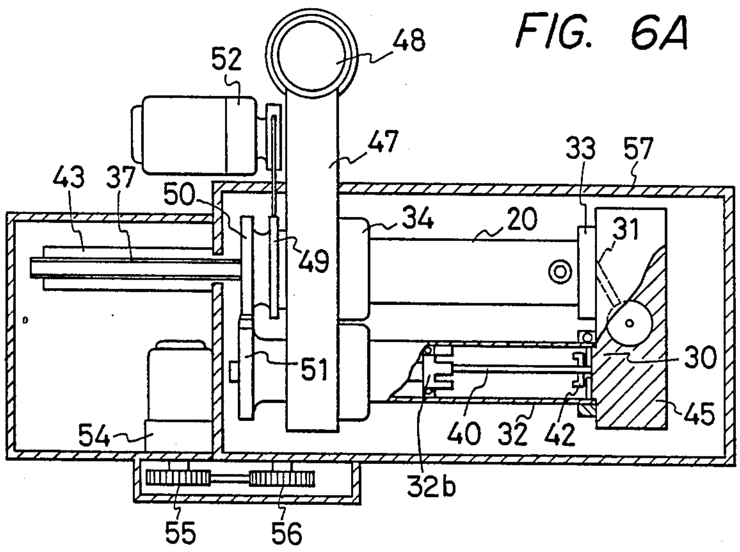
FIG. 6(*a*) is a partial plan cross-sectional view of a reactive injection molding machine which incorporates the second embodiment of a mixing apparatus according to the present invention.
Figure 6B:
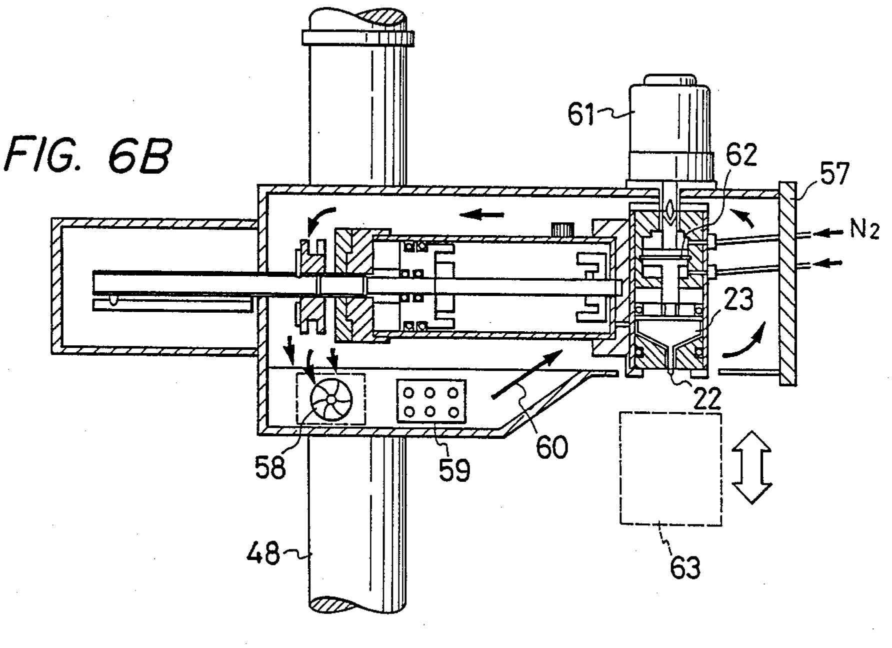

FIG. 6(*a*) and (*b*) illustrate a reactive injection molding which incorporates the second embodiment of the invention in conjunction with two of the piston cylinders described above. FIG. 6(*a*) is a cross-sectional view in plan showing the apparatus with the cover removed. FIG. 6(*b*) is a cross-sectional view in elevation. The piston cylinders 20 are respectively connected to a mixing head block 45 at one end of each of the piston cylinders, and are supported at the opposite ends thereof by an arm 47, which is attached to a shaft 48. The shaft 48 is movable in the vertical direction. The piston screws of the two piston cylinders, e.g. piston screw 37, are rotated by a motor 52, acting through a chain 49 and gearwheels 50 and 51 which provide a specific degree of speed reduction and thereby determine the speed of advancement and retraction of the pistons. The piston cylinders 32 and 20 and the mixing head block 45 are contained within a chamber 57. Heating to maintain the temperature within chamber 57 to a specific level is implemented by a flow of hot air 60 which flows in the direction indicated by the arrows, and is produced by a heater 59 and an impeller fan 58, driven through gear wheels 55, 56 by a motor 54. Numeral 63 denotes a reactive forming mold, composed of a material such as metal or rubber, which can be removably attached to the nozzle 24 constituting the ejection aperture of the mixing apparatus.

The mixing apparatus also includes a drive motor 61, for rotating the rotary member 23, and an actuating piston 62 moving within a cylinder and coupled to rotary member 23. The actuating piston 62 operates to move the rotary member 23 upward or downward, to open or close the mixing gap Δd respectively, by introduction of a gas or fluid under pressure into a lower and an upper chamber respectively of the cylinder in which piston 62 moves.

Figure 7A:
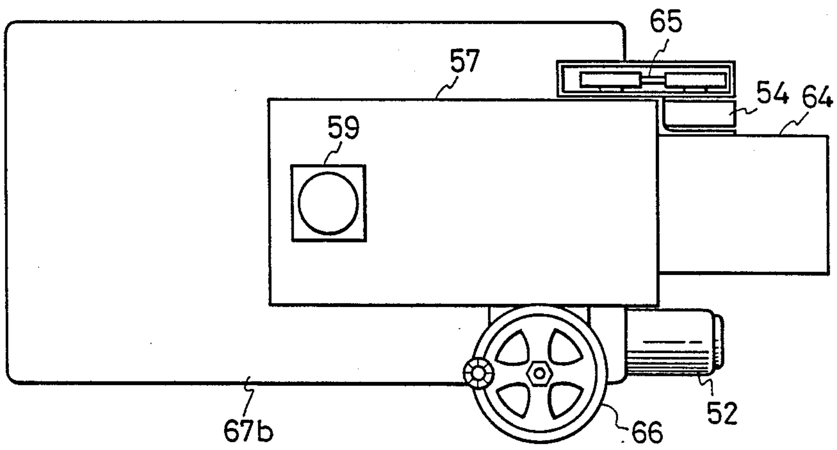
FIG. 7(*a*) and 7(*b*) are external views in plan and elevation respectively of the reactive injection molding machine of FIG. 6(*a*)
Figure 7B:
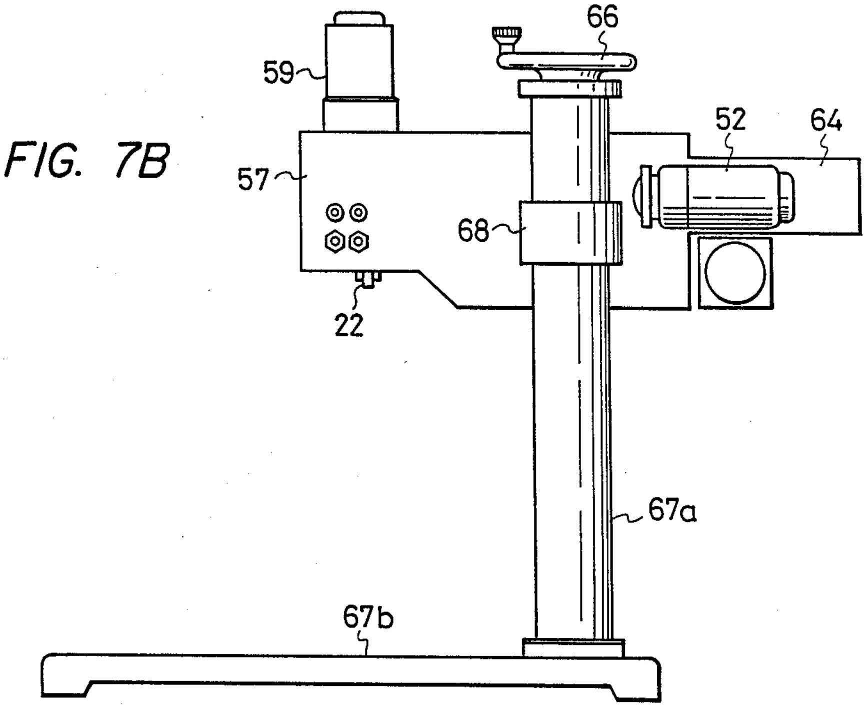

FIG. 7(*a*) and 7(*b*) are external views in plan and elevation respectively of a bench-mounting reactive injection molding which incorporates the mixing apparatus of FIG. 6. Numeral 65 denotes a cover which is mounted over the gear wheels driving the heating air impeller fan, while numeral 64 denotes a cover mounted over the piston screw drive assembly. The reactive injection molding unit is retained by an attachment member 68, and is moved upward or downward by rotation of a handle 66 which is rotatably mounted at the upper end of a supporting pillar 67*a* which is mounted on a base 67*b*.

Figure 8A:
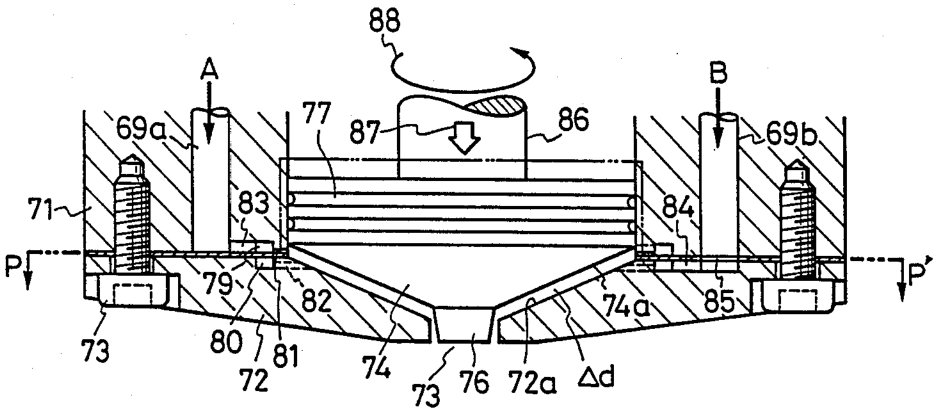
FIG. 8(*a*) is a cross-sectional view in elevation of a third embodiment of a mixing apparatus according to the present invention.
Figure 8B:
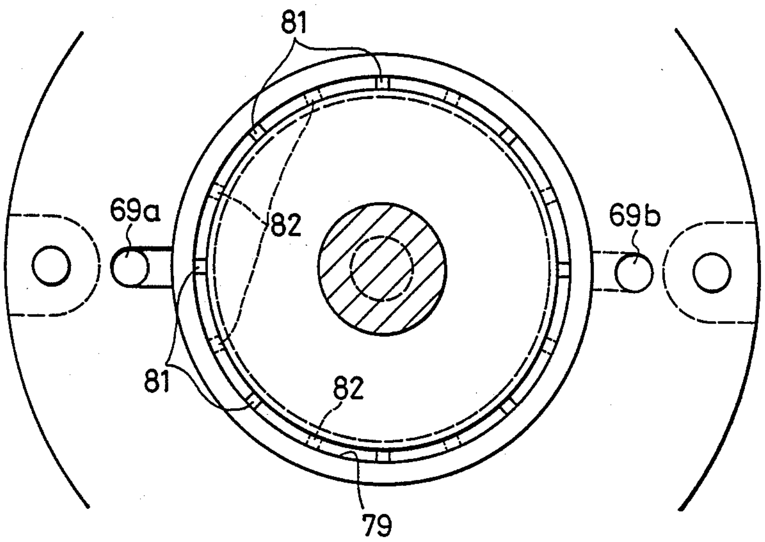

A third embodiment of a mixing apparatus according to the present invention will now be described, referring to FIGS. 8 through 10. FIGS. 8(*a*) and 8(*b*) are cross-sectional views in elevation and plan respectively of a mixing head of this embodiment, with FIG. 8(*b*) being taken along line p—p' shown in FIG. 8(*a*). As in the first two embodiments, a rotary member 74 is formed with a convex conical lower face 74*a*. An attachment member 72 is formed with a concave conical surface 72a, and is mounted at the lower end of a supporting member 71 in the form of a cylinder, constituting the body of the mixing head. The attachment member 72 is attached to the supporting member 71 by means of bolts 73, with a separator plate 85 being clamped between members 72 and 71. The rotary member 74 slidably fits within a central bore of cylinder 71. As in the previous embodiments, the rotary member 74 is movable axially upward and downward, to respectively open and close a mixing gap Δd formed between the surfaces 72a and 74a, and is rotated during mixing in the direction indicated by arrow 88, at a speed which is determined in accordance with the viscosity of the fluids to be mixed and the rate of flow of the fluids into gap Δd, together with the size of gap Δd. A plurality of sealing rings 77 are mounted on the periphery of an upper part of rotary member 74. The rotary member is coupled by a shaft 86 to a drive motor and actuating piston (not shown in the drawings), as for the second embodiment of the invention described hereinabove, whereby rotation of the rotary member and selective opening and closing of the mixing gap Δd are performed. This embodiment is assumed to be applied to mixing of two fluid raw materials, designated as A and B.

Numerals 79 and 80 denote annular grooves of identical diameter, formed in opposing faces of members 71 and 72 respectively, which communicate through communicating grooves 83, 84 respectively with fluid inlet passages 69a, 69b respectively. Radially extending grooves 81 and 82 lead from the annular grooves 79, 80 respectively into the mixing gap Δd, to thereby form respective supply apertures. The fluid supply passages which are thereby formed, leading from the inlet passages 69a and 69b for raw material liquids A and B respectively to the latter supply apertures, are separated by the separator plate 85. This ensures that no mingling of liquids A and B will occur prior to the actual mixing process within the mixing gap.

As can be understood from FIGS. 8(*a*), 8(*b*), successive ones of a first plurality of supply apertures, for liquid A, and a second plurality of supply apertures, for liquid B, are arranged in a mutually alternating manner around the outer periphery of the mixing gap Δd. It should be noted that it is possible to modify this embodiment to perform mixing of three or more liquids, by suitably arranging the positions of respective annular grooves for the liquids and providing additional superimposed separator plates to separate the various liquids, in conjunction with respective peripherally disposed liquid supply passages.

The resultant mixture from the apparatus flows outward through an ejection aperture 205. A conical tip portion 76 of rotary member 74, formed at the lower end of member 74, serves to accurately position the rotation member with respect to the ejection aperture 73.

Figure 9:
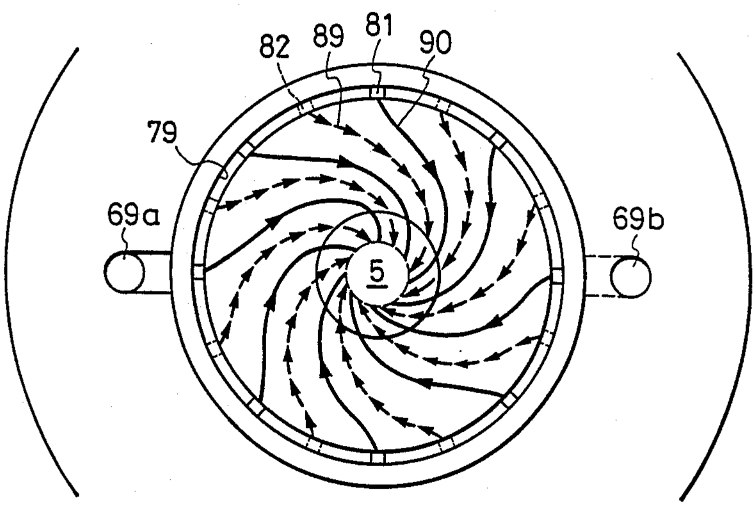
FIG. 9 is an outline diagram in plan for illustrating the process of mixing a plurality of fluids by the third embodiment.

FIG. 9 is a plan outline view, for illustrating the manner in which mixing of the two liquids takes place, as a result of the successively alternating arrangement of the supply apertures 81, 82. The flow path of liquid A, which passes through supply apertures 81, is indicated by the full-line arrows, while the flow paths of liquid B, which passes through supply apertures 82, is indicated by the broken-line arrows. In FIG. 9 it is assumed that the mixing gap Δd is of relatively large size and that the rotary member 104 is rotating relatively slowly. As the size of the mixing gap is decreased, and the speed of rotation of rotary member 104 is increased, the speed of movement of the fluids A and B will become slower in the vicinity of the ejection aperture than the speed immediately after entry to the mixing gap. As a result, shear stress will be created within the liquids, causing thorough mixing of the liquids.

Figure 10:
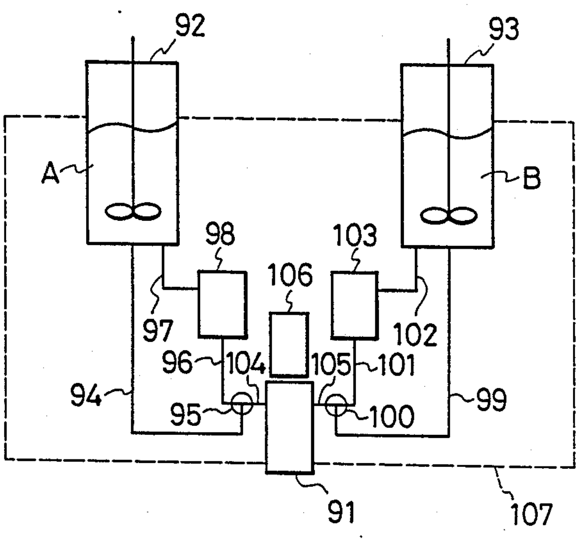
FIG. 10 is a block diagram showing the general configuration of a reactive injection molding machine which employs a mixing apparatus according to the third embodiment of the invention.

FIG. 10 is a block diagram to illustrate the general configuration of a nylon reactive injection molding, employing the third embodiment of a mixing apparatus according to the present invention. It is assumed that the raw materials are initially in the form of powders. The raw material powders are respectively placed in two raw material tanks 92 and 92, and are melted therein by being heated to a temperature of 80° to 90° C. The liquified raw material A is then passed from tank 92 along a path leading through a pipe 97, a gear pump 98, a pipe 96, a 3-way valve 95, and a pipe 94, back into tank 92. Similarly, the liquified raw material B is passed from tank 93 along a path leading through a pipe 102, a gear pump 103, a pipe 101, a 3-way valve 100, and a pipe 99, back into tank 93. When injection molding is to be performed, the 3-way valves 95 and 100 are actuated such as to transfer the liquified raw materials A and B through pipes 104 and 105 respectively to the mixing head 91, and mixed therein. A head drive unit 106 positioned above the mixing head 91, contains drive motor and an actuating piston forming a single unit. All of the above components other than the inlet apertures of tanks 92 and 93 and the ejection aperture of the mixing head 91 are contained within a constant-temperature oven 107, to be held thereby at a temperature of 80° C. or higher.

The ejection aperture of mixing head 91 leads into a rubber or metal mold, whereby molded components of various type may be produced.

It is an important feature of this third embodiment that each of the raw materials is transferred into the mixing gap through two or more supply apertures, and that the supply apertures are arranged in mutually successively alternating positions around the periphery of the mixing gap. This ensures more effective mixing of the raw materials by shear stress produced within the mixing gap than is possible with a more simple arrangement in which such a system of alternately arranged supply apertures is not employed. This embodiment of the present invention therefore ensures effective mixing of raw materials which have a high degree of viscosity.

Although the present invention has been described in the above with reference to specific embodiments, it should be noted that various changes and modifications to the embodiments may be envisaged, which fall within the scope claimed for the invention as set out in the appended claims. The above specification should therefore be interpreted in a descriptive and not in a limiting sense.

What is claimed is:

1. An apparatus for mixing a plurality of liquids, comprising:

a mixing head having a cylindrical bore formed therein, and having a lower surface with an ejection aperture formed therein for outlet of a mixture of said liquids following mixing;

a rotary member shaped to fit closely within said cylindrical bore opposite said lower surface of said mixing head, and supported by a shaft for rotation relative to said lower surface of said mixing head and for movement along the axis of said rotation for selectively establishing a condition in which said rotary member is in close contact with said lower surface of said mixing head and a condition in which a mixing gap is formed between said rotary member, said lower surface of the mixing head, and a circumferential section of said cylindrical bore;

means for rotating said rotary member;

means for axially displacing said rotary member along said axis of rotation;

a plurality of supply apertures formed in said mixing head, communicating with said mixing gap, for supplying said raw materials in liquid form said mixing gap;

sealing means disposed between said rotary member and said mixing head; and means for supplying said liquified raw materials to said supply apertures, wherein said means for displacing said rotary member along said axis of rotation comprises an elastic body, said elastic body being compressed under the action of the liquified raw materials entering the mixing gap to cause the rotary member to move away from the lower surface of the mixing head to compress the elastic body, and wherein the spring force of the compressed elastic body serves to restore the elastic body in the direction of the lower surface of the mixing head to reduce the size of the mixing gap upon termination of supplying of the liquified raw materials into the gap.

2. A mixing apparatus according to claim 1, wherein said lower surface of the mixing head and a lower surface of said rotary member disposed opposed thereto are respectively formed with a concave conical surface and a convex conical surface, to permit close contact between said surfaces other than at portions thereof corresponding to said ejection aperture.

3. The apparatus of claim 2, wherein said ejection aperture is formed substantially centrally in said concave conical surface.

4. A mixing apparatus according to claim 1, wherein said plurality of supply apertures comprises independent supply apertures for supplying each of said liquified raw materials to said mixing gap.

5. The apparatus of claim 1, wherein said mixing head further includes a detergent liquid inlet aperture leading into the mixing gap adapted to introduce a detergent liquid to clean the mixing gap.

6. The apparatus of claim 5, wherein said mixing head further includes a cleaning gas inlet aperture leading into the mixing gap.

7. The apparatus of claim 6, wherein said detergent liquid is an organic solvent and said cleaning gas is an inert gas injected under pressure into the mixing gap.

8. The apparatus of claim 1, wherein said liquified raw materials form a synthetic resin.

9. The apparatus of claim 1, wherein the supplying means has at least two piston cylinders connected to said mixing head at one end thereof such that an axial direction of each of said piston cylinders is substantially normal to an axial direction of said rotary member and such that said piston cylinders and said mixing head are of unitary construction, each of said piston cylinders having means for stirring said liquified raw material.

10. The apparatus of claim 9, further comprising a chamber for containing said mixing head and said at least two piston cylinders therein, and means for heating said mixing head and said at least two piston cylinders.

* * * * *